United States Patent
Zheng et al.

(10) Patent No.: US 8,585,045 B2
(45) Date of Patent: Nov. 19, 2013

(54) APPARATUS AND METHOD FOR PROCESSING A RECORDING MEDIUM WITH EMBEDDED INFORMATION

(75) Inventors: Lei Zheng, Shandong (CN); Lei Che, Shandong (CN); Qiangzi Cong, Shandong (CN); Tianxin Jiang, Shandong (CN); Mingdong Huang, Shandong (CN)

(73) Assignee: Shangdong New Beiyang Information Technology Co., Ltd., Weihai, Shandong (CN)

( * ) Notice: Subject to any disclaimer, the term of this patent is extended or adjusted under 35 U.S.C. 154(b) by 29 days.

(21) Appl. No.: 13/395,109

(22) PCT Filed: Sep. 9, 2010

(86) PCT No.: PCT/CN2010/076781
§ 371 (c)(1),
(2), (4) Date: Mar. 8, 2012

(87) PCT Pub. No.: WO2011/029403
PCT Pub. Date: Mar. 17, 2011

(65) Prior Publication Data
US 2012/0168495 A1    Jul. 5, 2012

(30) Foreign Application Priority Data

Sep. 11, 2009  (CN) .......................... 2009 1 0170317

(51) Int. Cl.
*B65H 29/00*    (2006.01)
(52) U.S. Cl.
USPC .......................................... 271/184; 235/441
(58) Field of Classification Search
USPC .......................................... 235/441; 271/184
See application file for complete search history.

(56) References Cited

U.S. PATENT DOCUMENTS 5,683,079 A * 11/1997 Ebrahimi ................. 271/258.01
6,722,649 B2 * 4/2004 Yui .............................. 271/184
(Continued)

FOREIGN PATENT DOCUMENTS

| CN | 1463227 | 12/2003 |
| CN | 101526793 | 9/2009 |

(Continued)

OTHER PUBLICATIONS

International Search Report from International Application No. PCT/CN2010/076781 dated Dec. 23, 2010.

*Primary Examiner* — Daniel Hess
(74) *Attorney, Agent, or Firm* — Workman Nydegger

(57) ABSTRACT

An apparatus for processing a recording medium with embedded information is disclosed, which comprises: a Y shape channel mechanism including a first channel, a second channel and a third channel, wherein all the channels are joined with each other at the inner end; a processing device including a magnetic head mechanism which is located in the first channel and used for reading magnetic information of the recording medium and a print mechanism located on one side of the third channel or one side of the second channel ; and a guide mechanism, located at the joining position of the first channel, a second channel and the third channel and used for guiding the recording medium to be conveyed among the channels. A method for processing a recording medium with embedded information is also disclosed. The solution can realize the reading of the magnetic information and the overturn of the recording medium so that the printing on both sides of the recording medium can be realized by using one print head.

10 Claims, 8 Drawing Sheets

(56) References Cited

U.S. PATENT DOCUMENTS

2004/0028447 A1* 2/2004 Sasaki ................... 400/578
2005/0123336 A1 6/2005 Oshida et al.

FOREIGN PATENT DOCUMENTS

| | | |
|---|---|---|
| CN | 201485087 | 5/2010 |
| CN | 201511603 | 6/2010 |

* cited by examiner

APPARATUS AND METHOD FOR PROCESSING A RECORDING MEDIUM WITH EMBEDDED INFORMATION

This application is a U.S. Nationalization of PCT International Application No. PCT/CN2010/076781 titled as "DEVICE AND METHOD FOR PROCESSING RECORDING MEDIUM WITH EMBEDDED INFORMATION" and filed on Sep. 9, 2010, which claims the priority of Chinese patent application No. 200910170317.9 titled as "APPARATUS AND METHOD FOR PROCESSING A RECORDING MEDIUM WITH EMBEDDED INFORMATION" and filed on Sep. 11, 2009, the entire contents of each of the foregoing applications are hereby incorporated by reference.

TECHNICAL FIELD OF THE INVENTION

The present invention relates to the field of processing a recording medium, in particular to an apparatus and a method for processing a recording medium with embedded information.

BACKGROUND OF THE INVENTION

When securities such as checks and tickets are printed, magnetic ink information is generally embedded into a recording medium to prevent forgery by criminals. For example, checks are widely applied in bargaining transaction and personal consumption. Generally, information such as the par value of the check and the drawee signature is recorded on a front side of the check. For the convenience to describe, such information is referred to as front-side signing information. Besides, the check is recorded with information such as banking organization code, personal bank account and check series number through magnetic ink.

The front-side signing information of the traditional checks is manually signed by the owner of the check. However, in recent years, people have started to print the front-side signing information by a printer. The magnetic ink characters of the check can be identified by a magnetic head through an MICR technology. For example, after a check is received by a retail store, the magnetic ink on the check is firstly detected by a card reader, and then the information recorded with the magnetic ink is read, to affirm the validness of the check. After the check is affirmed to be valid, the operator prints the endorsement such as a certification and a name of a user who receives the check on the back side of the check by the printer.

In the conventional art, different apparatuses are required to read the magnetic ink of the check, print the endorsement and print the front-side signing information, and thus the processing steps are cumbersome, and the processing time is long. Therefore, it is desired to provide a device which can comprehensively process recording medium with embedded information.

SUMMARY OF THE INVENTION

Therefore, the purpose of the present invention is to provide an apparatus for processing a recording medium with embedded information, which can realize the identification of the magnetic information and the printing on both sides. The purpose of the present invention is also to provide a method for processing a recording medium with embedded information.

According to one aspect of the present invention, an apparatus for processing a recording medium with embedded information is provided, which comprises: a Y shape channel mechanism including a first channel, a second channel and a third channel joined together at one end of each channel, wherein at least the other end of the first channel is an inlet/outlet port for the recording medium; a processing device including a magnetic head mechanism located in the first channel and used for reading magnetic information of a recording medium and a print mechanism located on one side of the third channel or one side of the second channel; and a guide mechanism located at the joining position of the first channel, a second channel and the third channel for guiding the recording medium to be conveyed among the channels.

Further, the guide mechanism is substantially triangular and pivotally located in a first position and a second position, wherein when the guide mechanisms in the first position, the first channel and the second channel are communicated with each other, the second channel and the third channel are communicated with each other, and the third channel and the first channel are closed with each other; and when the guide mechanism is in the second position, the first channel and the second channel are closed with each other, the second channel and the third channel are closed with each other, and the first channel and the third channel are communicated with each other.

Further, the first channel and the second channel are joined linearly, and the third channel is substantially perpendicular to the first channel and the second channel.

Further, the other ends of the second channel and the third channel are inlet/outlet ports for the recording medium, respectively.

Further, the print mechanism of the processing device is located on one side of the third channel which is adjacent to the first channel. It may be conceived that the print mechanism of the processing device also may be located on one side of the third channel which is adjacent to the second channel.

Further, the processing device further comprises an image scanning device located in one of the first channel, the second channel and the third channel and including at least one image sensor.

In addition, the present invention further provides a method for processing a recording medium with embedded information, which comprises the following steps: A) reading the magnetic information of the recording medium; B) printing one side of the read recording medium with the magnetic information having been read; C) overturning the printed recording medium; and D) printing on the other side of the recording medium after being overturned.

Further, in the Step A, the magnetic information of the recording medium with embedded information is read during the recording medium being guided into the second channel or third channel from the first channel for the first time, wherein the first channel, the second channel and the third channel are communicated in a Y-shape; in the Step B, the recording medium with the magnetic information having been read is guided into or out of the third channel so as to print information on one side of the recording medium; in the Step C, the printed recording medium is conveyed among the first channel, the second channel and the third channel according to a preset sequence so as to overturn the recording medium; and in the Step D, the recording medium is guided into or out of the third channel again so as to print information on the other side of the recording medium.

According to another aspect of the present invention, a specific processing method is provided, wherein, in the Step A, the magnetic information is read during the recording medium being guided into the second channel from the first channel; in the Step B, information is printed on one side of the recording medium during the recording medium being guided into the third channel from the second channel; in the Step C, the recording medium, one side of which has been printed, is guided into the first channel from the third channel at first, and then guided into the second channel from the first channel; and in the Step D, information is printed on the other side of the recording medium during the recording medium in the second channel being guided into the third channel.

According to still one aspect of the present invention, another specific processing method is provided, wherein, in the Step A, the magnetic information is read during the recording medium being guided into the second channel from the first channel; in the Step B, the recording medium is guided into the third channel from the second channel, and then information is printed on one side of the recording medium during the recording medium being guided into the first channel from the third channel; in the Step C, the recording medium, one side of which has been printed, is guided into the second channel from the first channel at first, and then guided into the third channel from the second channel; and in the Step D, information is printed on the other side of the recording medium during the recording medium in the third channel being guided into the first channel.

According to yet one aspect of the present invention, a third specific processing method is provided, wherein, in the Step A, the magnetic information is read during the recording medium being guided into the third channel from the first channel; in the Step B, information is printed on one side of the recording medium during the recording medium being guided into the first channel from the third channel; in the Step C, the recording medium, one side of which has been printed, is guided into the second channel from the first channel; and in the Step D, information is printed on the other side of the recording medium during the recording medium in the second channel being guided into the third channel.

According to the method in the present invention, the method further comprises the following steps: E) scanning the image on the recording medium before Step B; and F) scanning the image on the recording medium after Step D.

The present invention has the advantages that, by providing a Y shape channel with a magnetic head mechanism and a print mechanism arranged in the branches thereof and using a guide mechanism to guide the recording medium to be conveyed around the Y shape channel, on one hand, the reading of magnetic information is realized, and on the other hand, recording medium is overturned, so that the printing on both sides of the recording medium is realized using one single print head. Thus, a comprehensive process for the recording medium with embedded information is realized, and the cost of the apparatus is reduced.

Besides the purposes, features and advantages described above, the present invention also has other purposes, features and advantages. The other purposes, features and advantages of the present invention will be further described in detail below with reference to drawings.

BRIEF DESCRIPTION OF THE DRAWINGS

Drawings, which constitute a part of the description and are provided for further understanding of the present invention, show the preferred embodiments of the present invention, and explain the principle of the present invention together with the description. In the drawings.

DETAILED DESCRIPTION OF THE INVENTION

Figure 1:
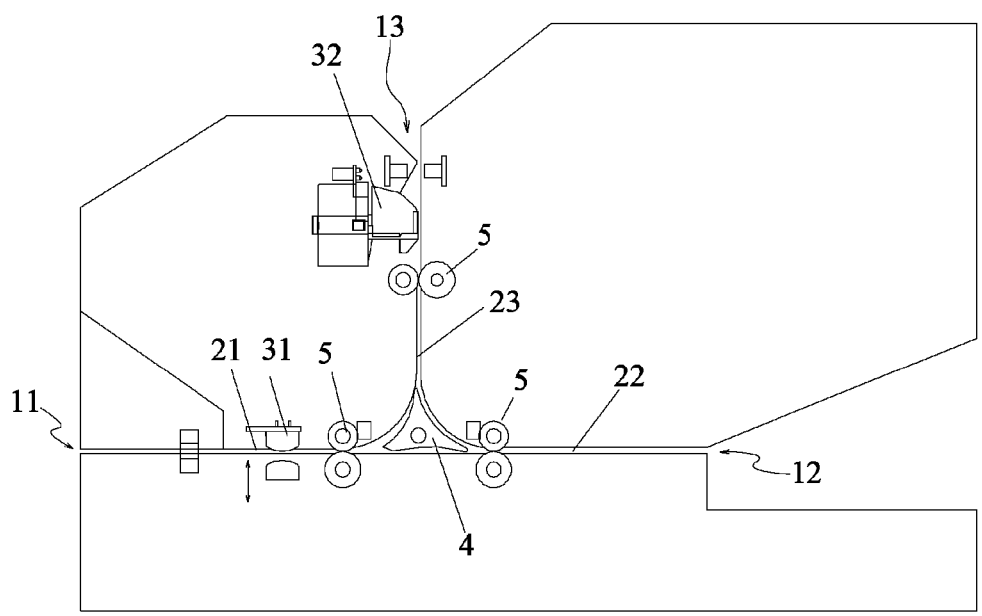
FIG. 1 is a schematic view of a apparatus for processing a recording medium with embedded information according to an embodiment of the present invention, wherein the guide mechanism is in the first position.
Figure 2:
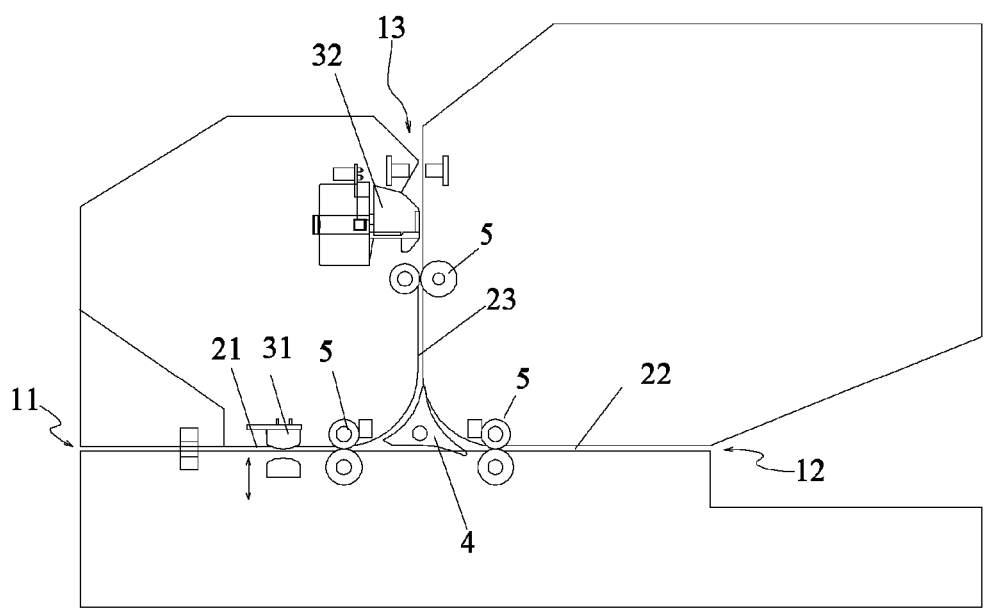
FIG. 2 is a schematic view of the recording medium processing apparatus as shown in FIG. 1, wherein the guide mechanism is in the second position.

The embodiments of the present invention will be described in detail below with reference to drawings, however the present invention may be implemented by various embodiments defined and covered by the claims. In the drawings, identical components are indicated with identical numbers.

FIG. 1 shows an apparatus for processing a recording medium with embedded information according to an embodiment of the present invention. As shown in the figure, the recording medium processing apparatus comprises an inlet/outlet port, a channel mechanism, a processing device and a guide mechanism 4.

In the above, the inlet/outlet port includes a first inlet/outlet port 11, a second inlet/outlet port 12 and a third inlet/outlet port 13.

The channel mechanism includes a first channel 21, a second channel 22 and a third channel 23, which are joined with each other and arranged with Y-shape.

The first inlet/outlet port 11 is connected with one end of the first channel 21 and configured to input or discharge the recording medium into or from the first channel 21; the second inlet/outlet port 12 is connected with one end of the second channel 22 and configured to input or discharge the recording medium into or from the second channel 22; and the second inlet/outlet port 13 is connected with one end of the third channel 23 and configured to input or discharge the recording medium into or from the third channel 23.

The processing device comprises a magnetic head mechanism 31 and a print mechanism 32. The magnetic head mechanism 31 is located in the first channel 21 and configured to read the magnetic information of the recording medium. The print mechanism 32 is provided with a print head which is located on one side of the third channel 23 and configured to print information on the recording medium.

The guide mechanism 4 is located at the joining position of the first channel 21, the second channel 22 and the third channel 23, and configured to guide the conveying direction of the medium. In particular, the guide mechanism 4 is substantially triangular and hinged with a main body of the recording medium processing apparatus so as to be rotatable around the hinge point.

Under the drive of the driving device (not shown) of the guide mechanism, the guide mechanism 4 has a first position and a second position for guiding the recording medium. When the guide mechanism 4 is in the first position, the first channel 21 and the second channel 22 are communicated with each other, the second channel 22 and the third channel 23 are communicated with each other, and the third channel 23 and the first channel 21 are closed with each other. When the guide mechanism 4 is in the second position, the first channel 21 and the second channel 22 are closed with each other, the second channel 22 and the third channel 23 are closed with each other, and the first channel 21 and the third channel 23 are communicated with each other.

Figure 3:
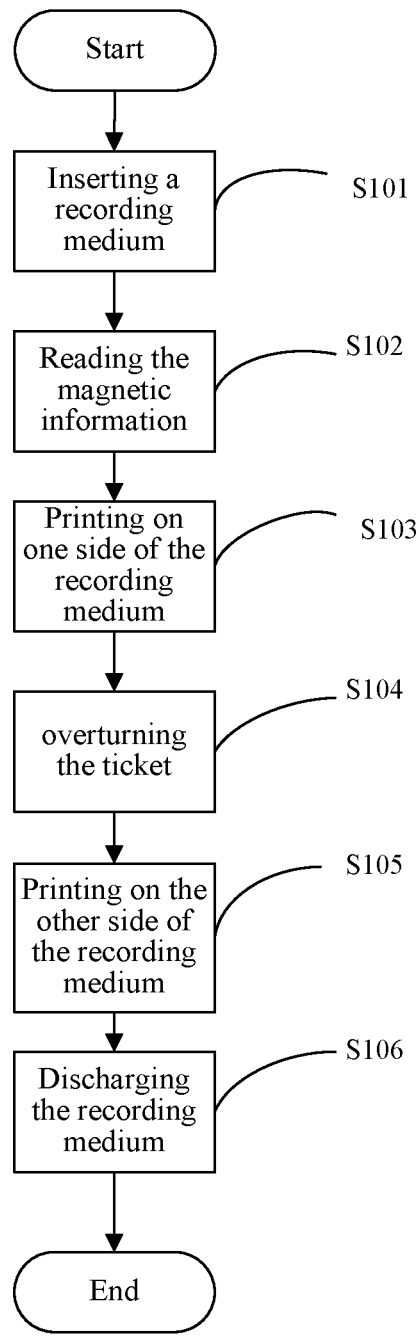
FIG. 3 is a general flow chart for processing a recording medium by the recording medium processing apparatus according to an embodiment of the present invention.

FIG. 3 shows the general flow chart for the recording medium processing apparatus according to an embodiment of the present invention. The process for processing the recording medium comprises the following steps:

Step S101: inserting a recording medium;

Step S102: reading the magnetic information of the recording medium;

Step S103: printing Information on one side of the recording medium;

Step S104: overturning the recording medium;

Step S105: printing information on the other side of the recording medium; and

Step S106: discharging the recording medium.

A specific method for processing the recording medium will be described below with reference to FIG. 4 and FIG. 5, respectively.

For the convenience to describe, a movement direction towards the second inlet/outlet port 12 from the first inlet/outlet port 11 along the first channel 21 and the second channel 22 is referred to as the first direction; a movement direction towards the third inlet/outlet port 13 from the second inlet/outlet port 12 along the second channel 22 and the third channel 23 is referred to as a second direction; and a movement direction towards the first inlet/outlet port 11 from the third inlet/outlet port 13 along the third channel 23 and the first channel 21 is referred to as a third direction.

Figure 4:
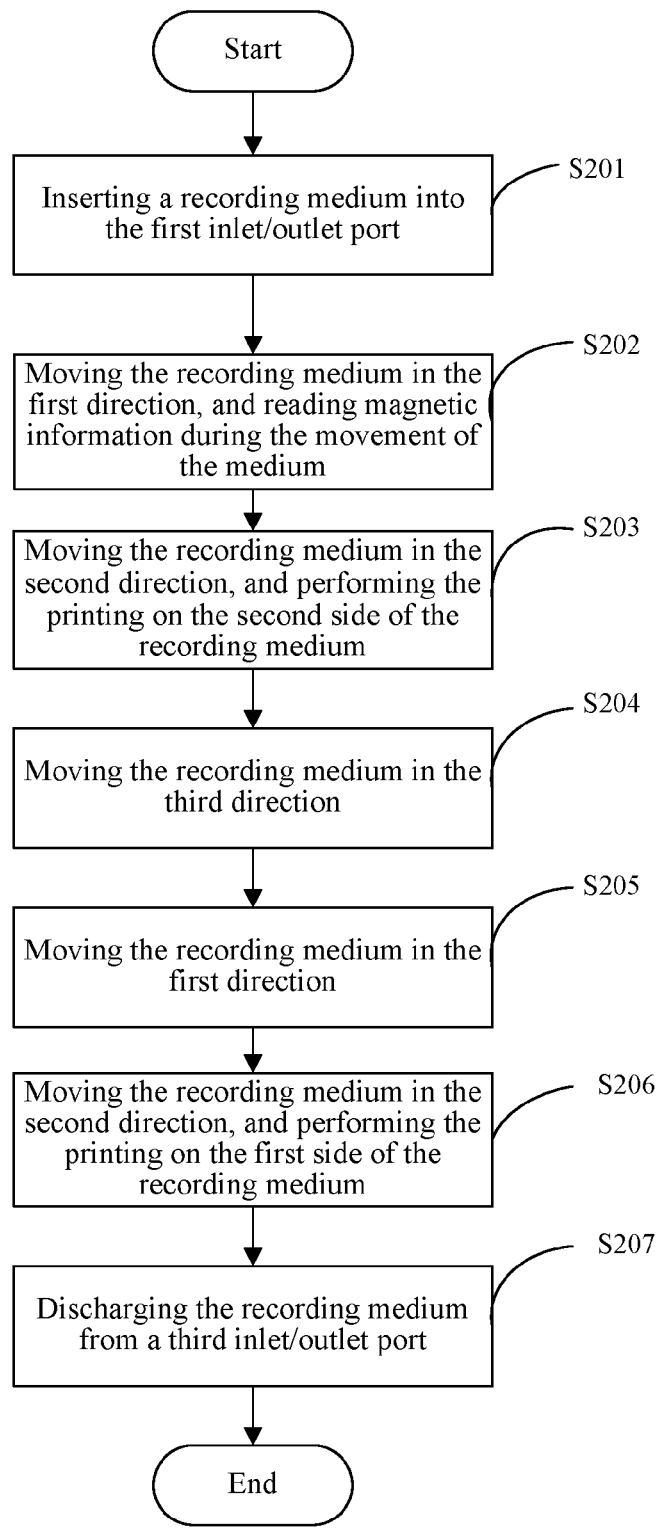
FIG. 4 is a flow chart of a specific processing method of the recording medium processing flow as shown in FIG. 3.

FIG. 4 is a flow chart of a specific processing method of the recording medium processing flow as shown in FIG. 3. As shown, a method for processing the recording medium comprises the following steps:

Step S201: inserting a recording medium into the first inlet/outlet port 11.

Step S202: moving the recording medium in the first direction and reading the magnetic information during the movement of the medium.

The guide mechanism 4 is driven to the first position, so that the first channel 21 and the second channel 22 are communicated with each other and the second channel 22 and the third channel 23 are communicated with each other, the recording medium is moved in the first direction, and thus the recording medium enters the second channel 22 from the first inlet/outlet port 11 through the first channel 21 and the guide mechanism 4. During the movement of the recording medium, the magnetic information recorded on the recording medium is read by the magnetic head mechanism.

Step S203: moving the recording medium in the second direction and performing the printing on the second side of the recording medium.

The recording medium enters the third channel 23 from the second channel 22 in the second direction. During the movement of the recording medium, information is printed on the second side of the recording medium by the print mechanism.

Step S204: moving the recording medium in the third direction.

The guide mechanism is driven to the second position, so that the first channel 21 and the third channel 23 are communicated with each other; and the recording medium enters the first channel 21 from the third channel 23 through the guide mechanism 4.

Step S205: moving the recording medium in the first direction.

The guide mechanism 4 is driven to the first position, so that the first channel 21 and the second channel 22 are communicated with each other, the second channel 22 and the third channel 23 are communicated with each other, and the recording medium is moved to the second channel 22 from the first channel 21 through the guide mechanism in the first direction.

Step S206: moving the recording medium in the second direction and performing the printing on the first side of the recording medium.

The recording medium is moved to the third channel 23 from the second channel 22 through the guide mechanism in the second direction. At this moment, the recording medium is overturned and the first side of the recording medium faces the print head. During the movement of the recording medium in the second direction, information is printed on the first side of the recording medium by the print mechanism.

Step S207: discharging the recording medium from the third inlet/outlet port 13.

After the first side of the recording medium has been printed, the recording medium is discharged from the third inlet/outlet port 13 along the third channel 23.

Figure 5:
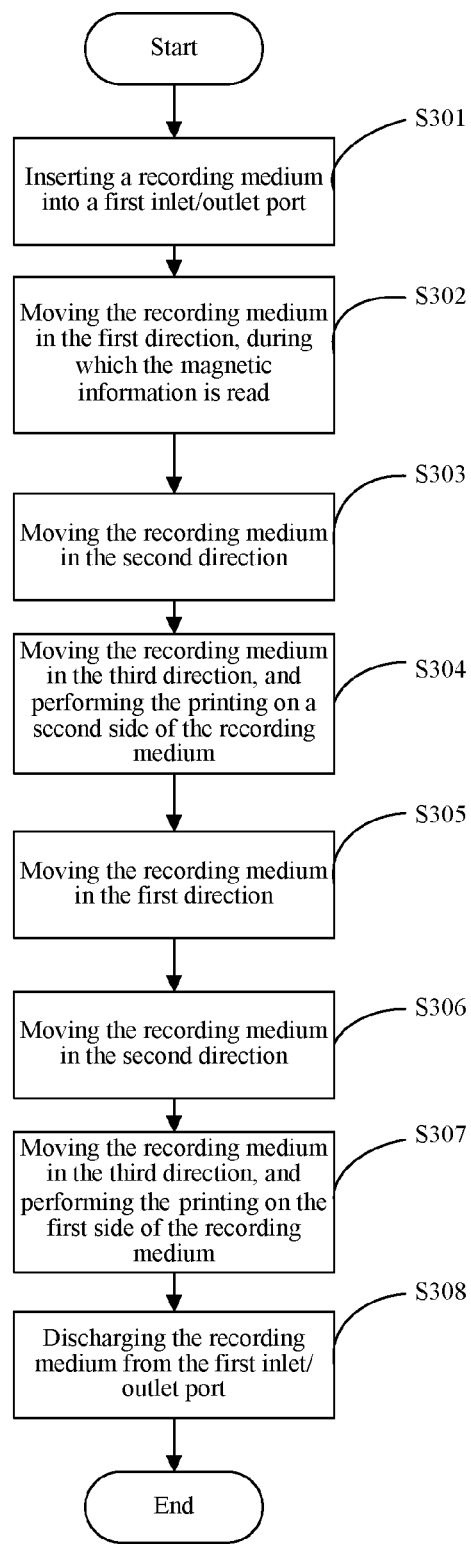
FIG. 5 is a flow chart of another specific processing method of the recording medium processing flow as shown in FIG. 3.

FIG. 5 is a flow chart of another specific processing method of the recording medium processing flow as shown in FIG. 3. As shown, the method for processing the recording medium comprises the following steps:

Step S301: inserting a recording medium into the first inlet/outlet port 11.

Step S302: moving the recording medium in the first direction, during which the magnetic information is read.

The guide mechanism is driven to the first position, so that the first channel 21 and the second channel 22 are communicated with each other, the second channel 22 and the third channel 23 are communicated with each other, the recording medium is moved in the first direction, thus the recording medium enters the second channel 22 from the first inlet/outlet port 11 through the first channel 21 and the guide mechanism 4. During the movement of the recording medium, the magnetic information recorded on the recording medium is read by the magnetic head mechanism.

Step S303: moving the recording medium in the second direction.

The recording medium enters the third channel 23 from the second channel 22 through the guide mechanism in the second direction.

Step S304: moving the recording medium in the third direction, and performing the printing on the second side of the recording medium.

The guide mechanism is driven to the second position, so that the first channel 21 and the third channel 23 are communicated with each other; and the recording medium enters the first channel 21 from the third channel 23 through the guide mechanism. During the movement of the recording medium, information is printed on the second side of the recording medium by the print mechanism.

Step S305: moving the recording medium in the first direction.

The guide mechanism 4 is driven to the first position, so that the first channel 21 and the second channel 22 are communicated with each other, the second channel 22 and the third channel 23 are communicated with each other, and the recording medium is moved to the second channel 22 from the first channel 21 through the guide mechanism 4 in the first direction.

Step S306: moving the recording medium in the second direction.

The recording medium is moved to the third channel 23 from the second channel 22 through the guide mechanism in the second direction. At this moment, the recording medium is overturned, and the first side of the recording medium faces the print head.

Step S307: moving the recording medium in the third direction, and performing the printing on the first side of the recording medium.

The recording medium is moved to the first channel 21 from the third channel 23 through the guide mechanism 4 in the third direction. During the movement of the recording medium, information is printed on the first side of the recording medium by the print mechanism.

Step S308: discharging the recording medium from the first inlet/outlet port 11.

After the first side of the recording medium has been printed, the recording medium is discharged from the first inlet/outlet port 11 along the first channel 21.

Figure 6:
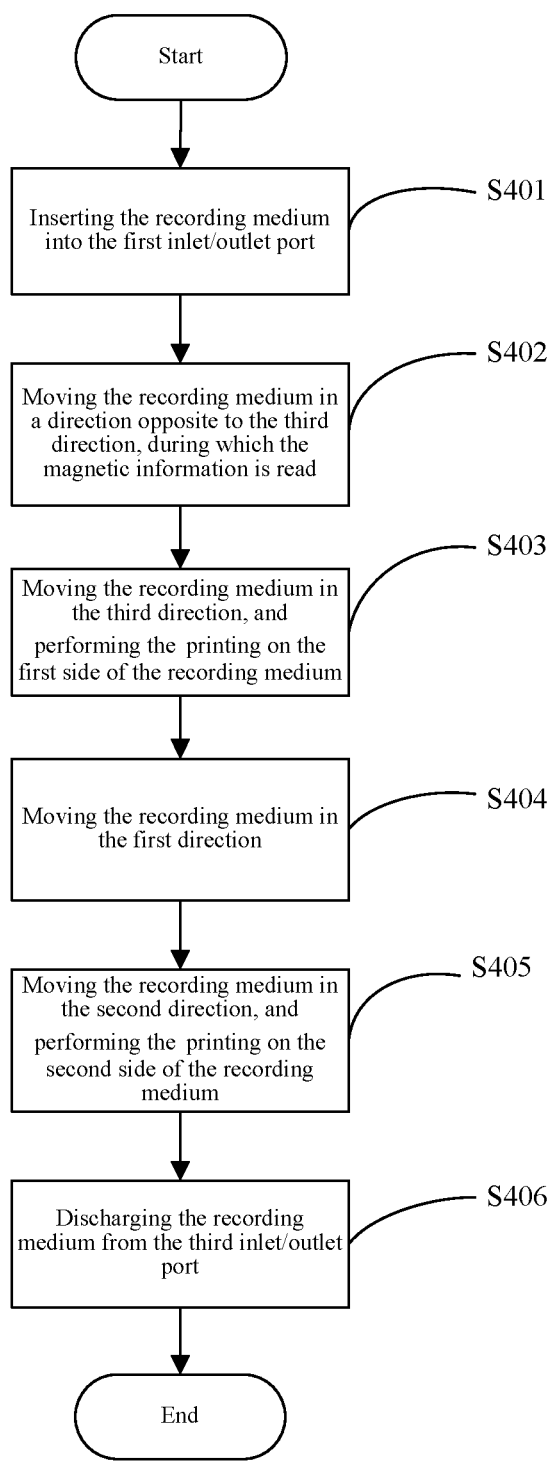
FIG. 6 is a flow chart of a third specific processing method of the recording medium processing flow as shown in FIG. 3.

FIG. 6 is a flow chart of a third specific processing method of the recording medium processing flow as shown in FIG. 3. As shown, the method for processing the recording medium comprises the following steps:

Step S401: inserting the recording medium into the first inlet/outlet port 11.

Step S402: moving the recording medium in a direction opposite to the third section during which the magnetic information is read.

The guide mechanism 4 is driven to the second position, so that the first channel 21 and the third channel 23 are communicated with each other and the recording medium is moved in the direction opposite to the third section, and thus the recording medium enters the third channel 23 from the first inlet/outlet port 11 through the first channel 21 and the guide mechanism 4. During the movement of the recording medium, the magnetic information recorded on the recording medium is read by the magnetic head mechanism.

Step S403: moving the recording medium in the third direction, and performing the printing on the first side of the recording medium.

The recording medium enters the first channel 21 from the third channel 23 through the guide mechanism 4 in the third direction. During the movement of the recording medium, information is printed on the first side of the recording medium.

Step S404: moving the recording medium in the first direction.

The guide mechanism 4 is driven to the first position, so that the first channel 21 and the second channel 22 are communicated with each other and the second channel 22 and the third channel 23 are communicated with each other, and the recording medium enters the second channel 22 from the first channel 21 through the guide mechanism in the first direction.

Step S405: moving the recording medium in the second direction, and performing the printing on the second side of the recording medium.

The recording medium is moved to the third channel 23 from the second channel 22 through the guide mechanism in the second direction. At this moment, the recording medium is overturned, and the second side of the recording medium faces the print head. During the movement of the recording medium, information is printed on the second side of the recording medium by the print mechanism.

Step S406: discharging the recording medium from the third inlet/outlet port.

After the second side of the recording medium has been printed, the recording medium is discharged from the third inlet/outlet port 13 along the third channel 23.

From above description, it can be seen that, in the recording medium processing apparatus of the present invention, by providing a Y shape channel with a magnetic head mechanism and a print mechanism arranged in the branches thereof, and a guide mechanism to guide the recording medium to be conveyed around the Y shape channel, on one hand, the reading of magnetic information is realized, and on the other hand, the recording medium is overturned, so that the printing on both sides of the recording medium is realized using one single print head. Thus, a comprehensive process for the recording medium with embedded information is realized, and the cost of the apparatus is reduced.

Figure 7:
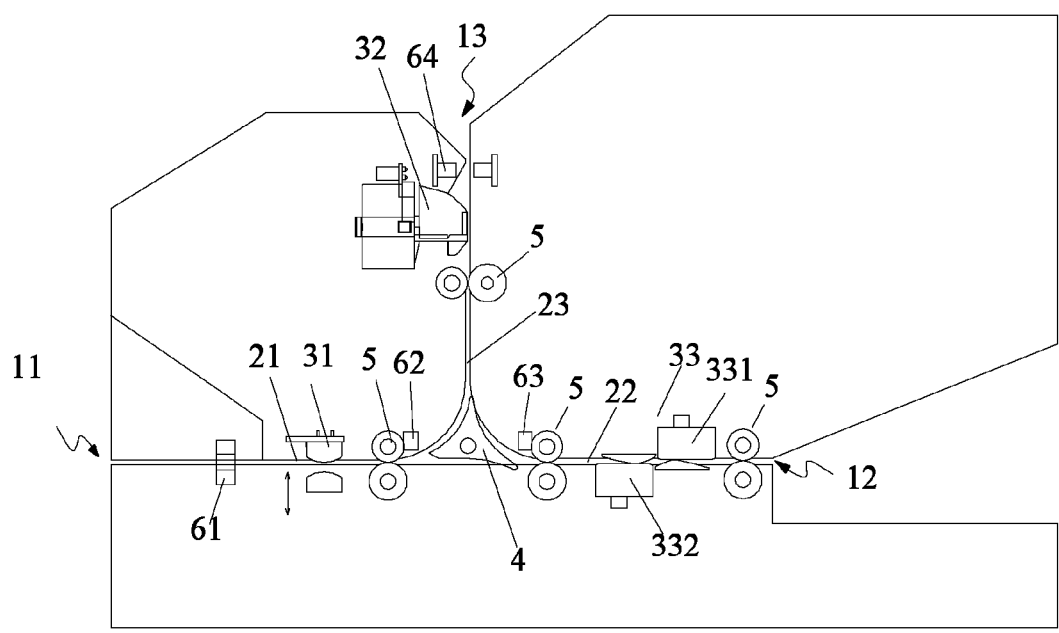
FIG. 7 is a schematic view of a recording medium processing apparatus according to another embodiment of the present invention.
Figure 8:
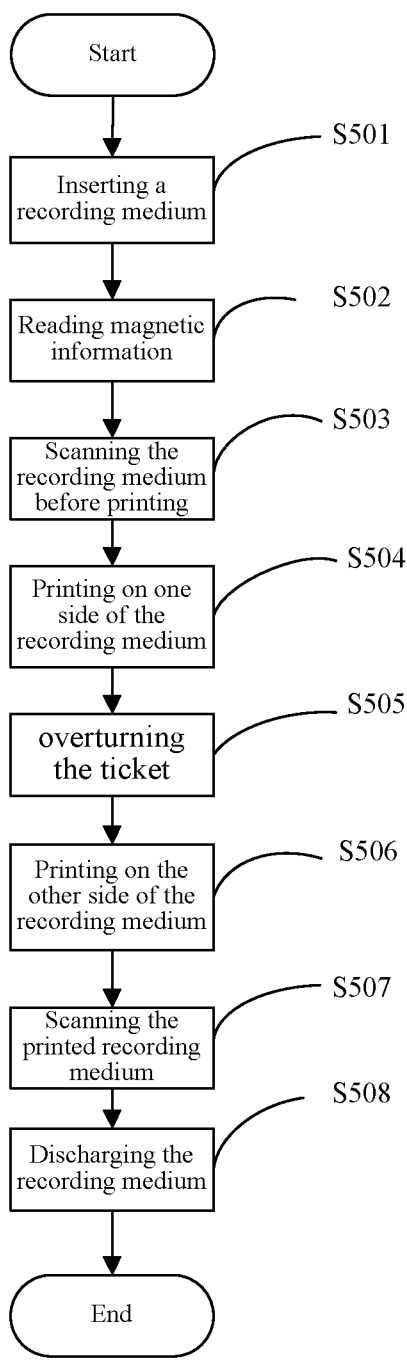
FIG. 8 is a flow chart of the recording medium processing flow by the recording medium processing apparatus as shown in FIG. 7.

FIG. 7 is a schematic view of a recording medium processing apparatus according to another embodiment of the present invention. The recording medium processing apparatus in this embodiment can scan the images on the recording medium, therefore it can be used in an application where scanning the recording medium images is required.

Different from the foregoing embodiment, the processing device 3 in the recording medium processing apparatus in this embodiment may further comprise an image scanning device 33. The image scanning device 33 may be located in any one of the first channel 21, the second channel 22 and the third channel 23 and include at least one image sensor for scanning the surface images of the recording medium. In the example shown in FIG. 7, the image scanning device 33 is located in the second channel 22 and includes a first image sensor 331 and a second image sensor 332 which are arranged opposite to each other. Preferably, the image sensor may be a Contact Image Sensor (CIS) or Charge-coupled Device (CCD).

The process for processing the recording medium in this embodiment will be described below. The flow for processing the recording medium in this embodiment comprises the following steps:

Step S501: inserting a recording medium; Step S502: reading the magnetic information of the recording medium; Step S503: scanning the image on the recording medium; Step S504: printing information on one side of the recording medium; Step S505: overturning the recording medium; Step S506: printing Information on the other side of the recording medium; Step S507: scanning the image on the printed recording medium; and Step S508: discharging the recording medium.

In such way, in the recording medium processing apparatus of the present invention, the images on the recording medium, which may be unprinted or printed, can be scanned with the image scanning device according to demands, and therefore the comprehensive processing ability is enhanced.

The above is only for describing the preferred embodiments of the present invention and not intended to limit the present invention. The present invention may have various modifications and changes for the skilled person in the art. Any modifications, equivalents and improvements made within the spirit and principle of the present invention should be included within the scope of the present invention.

The invention claimed is:

1. An apparatus for processing a recording medium with embedded information comprising:
   a Y shape channel mechanism including a first channel, a second channel and a third channel joined together at one end of each channel, wherein at least the other end of the first channel is an inlet/outlet port for the recording medium;

a processing device including a magnetic head mechanism located in the first channel and used for reading magnetic information of the recording medium and a print mechanism located on one side of the third channel or one side of the second channel; and a guide mechanism located at the joining position of the first channel, the second channel and the third channel for guiding the recording medium to be conveyed among the channels;

wherein the guide mechanism is substantially triangular and pivotally located in a first position and a second position, wherein when the guide mechanism is in the first position, the first channel and the second channel communicate with each other, the second channel and the third channel communicate with each other, and the third channel and the first channel are closed with respect to each other; and when the guide mechanism is in the second position, the first channel and the second channel are closed with respect to each other, the second channel and the third channel are closed with respect to each other, and the first channel and the third channel communicate with each other.

2. The apparatus for processing a recording medium with embedded information according to claim 1, wherein the first channel and the second channel are joined linearly, and the third channel is substantially perpendicular to the first channel and the second channel.

3. The apparatus for processing a recording medium with embedded information according to claim 1, wherein the other ends of the second channel and the third channel are inlet/outlet ports for the recording medium, respectively.

4. The apparatus for processing a recording medium with embedded information according to claim 1, wherein the print mechanism of the processing device is located on one side of the third channel which is adjacent to the first channel.

5. The apparatus for processing a recording medium with embedded information according to claim 1, wherein the processing device further comprises:

an image scanning device located in one of the first channel, the second channel and the third channel and including at least one image sensor.

6. A method for processing a recording medium with embedded information, comprising the following steps:

A) reading the magnetic information of the recording medium;

B) printing one side of the read recording medium with the magnetic information having been read;

C) overturning the printed recording medium; and

D) printing the other side of the recording medium after being overturned;

wherein in the Step A, the magnetic information of the recording medium with embedded information is read when the recording medium is guided into the second channel or the third channel from the first channel for the first time, wherein the first channel, the second channel and the third channel communicate in a Y-shape;

in the Step B, the recording medium with the magnetic information having been read is guided into or out of the third channel so as to print information on one side of the recording medium;

in the Step C, the printed recording medium is conveyed among the first channel, the second channel and the third channel according to a preset sequence so as to overturn the recording medium; and in the Step D, the recording medium is guided into or out of the third channel again so as to print information on the other side of the recording medium.

7. The method for processing a recording medium with embedded information according to claim 6, wherein in the Step A, the magnetic information is read during the recording medium being guided into the second channel from the first channel;

in the Step B, information is printed on one side of the recording medium during the recording medium being guided into the third channel from the second channel;

in the Step C, the recording medium, one side of which has been printed, is guided into the first channel from the third channel at first, and then guided into the second channel from the first channel; and in the Step D, information is printed on the other side of the recording medium during the recording medium in the second channel being guided into the third channel.

8. The method for processing a recording medium with embedded information according to claim 6, wherein in the Step A, the magnetic information is read during the recording medium being guided into the second channel from the first channel;

in the Step B, the recording medium is guided into the third channel from the second channel, and then information is printed on one side of the recording medium during the recording medium being guided into the first channel from the third channel;

in the Step C, the recording medium, one side of which has been printed, is guided into the second channel from the first channel at first, and then guided into the third channel from the second channel; and in the Step D, information is printed on the other side of the recording medium during the recording medium in the third channel being guided into the first channel.

9. The method for processing a recording medium with embedded information according to claim 6, wherein in the Step A, the magnetic information is read during the recording medium being guided into the third channel from the first channel;

in the Step B, information is printed on one side of the recording medium during the recording medium being guided into the first channel from the third channel;

in the Step C, the recording medium, one side of which has been printed, is guided into the second channel from the first channel; and in the Step D, information on the other side of the recording medium is printed during the recording medium in the second channel being guided into the third channel.

10. The method for processing a recording medium with embedded information according to claim 6, further comprising the following steps:

E) scanning the image on the recording medium before the Step B; and

F) scanning the image on the recording medium after the Step D.

* * * * *